(12) United States Patent
Zhang et al.

(10) Patent No.: US 8,402,140 B2
(45) Date of Patent: Mar. 19, 2013

(54) METHODS AND APPARATUS FOR COORDINATED ENERGY MANAGEMENT IN VIRTUALIZED DATA CENTERS

(75) Inventors: Hui Zhang, Princeton Junction, NJ (US); Ya-Yunn Su, Taiwan (CN); Guofei Jiang, Princeton, NJ (US); Kenji Yoshihira, Princeton Junction, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 162 days.

(21) Appl. No.: 13/004,063

(22) Filed: Jan. 11, 2011

(65) Prior Publication Data

US 2011/0173329 A1    Jul. 14, 2011

Related U.S. Application Data

(60) Provisional application No. 61/294,589, filed on Jan. 13, 2010.

(51) Int. Cl.
*G06F 15/173* (2006.01)
*G06F 9/46* (2006.01)

(52) U.S. Cl. ........................... 709/226; 718/105

(58) Field of Classification Search ................ None
See application file for complete search history.

(56) References Cited

U.S. PATENT DOCUMENTS

| | | | |
|---|---|---|---|
| 2010/0180275 A1* | 7/2010 | Neogi et al. | 718/1 |
| 2010/0332658 A1* | 12/2010 | Elyashev | 709/226 |
| 2011/0106949 A1* | 5/2011 | Patel et al. | 709/226 |
| 2011/0126206 A1* | 5/2011 | Kato et al. | 718/103 |

* cited by examiner

*Primary Examiner* — Hadi Armouche
*Assistant Examiner* — Jaron K Brunner
(74) *Attorney, Agent, or Firm* — Joseph Kolodka; Paul Schwarz; Bao Tran

(57) ABSTRACT

A method and system for coordinating energy management in a virtualized data center including a plurality of physical servers and a plurality of virtual machines (VMs), includes analyzing status information about the virtualized data center; determining server utilization target settings for server consolidation from the analyzed status information; and executing the server consolidation according to the determined server utilization target settings. Server consolidation can be executed by determining an effective size of each of the VMs and placing the VMs on the servers in a selective manner using an independent workload VM placement process, a correlation-aware VM placement process, or a migration-cost and correlation-aware VM placement process.

26 Claims, 4 Drawing Sheets

METHODS AND APPARATUS FOR COORDINATED ENERGY MANAGEMENT IN VIRTUALIZED DATA CENTERS

RELATED APPLICATIONS

This application claims the benefit of U.S. Provisional Application No. 61/294,589, filed Jan. 13, 2010, the entire disclosure of which is incorporated herein by reference.

FIELD

The present disclosure relates to virtualized data center energy management. More specifically, the present disclosure relates to methods and apparatus for coordinated virtualized data center energy management at cluster-level server on-off (consolidation) management, and server-level DVFS (dynamic voltage and frequency scaling) management.

BACKGROUND

The annual data center energy consumption in the US is estimated to grow to over 100 billion kWh at a cost of $7.4 billion by 2011. Another trend analysis estimates by 2014, Infrastructure and Energy costs would contribute about 75% while IT would contribute a significantly smaller 25% towards the overall total cost of operating a data center. Increasing the actual amount of computing work completed in the data center relative to the amount of energy used, is an urgent need in the new green IT initiative.

Both server consolidation and server features like voltage and frequency scaling can have a significant effect on overall data center performance per watt. Server consolidation is based on the observation that many enterprise servers do not utilize the available server resources maximally all of the time, and virtualization technologies facilitate consolidation of several physical servers onto a single high end system for higher resource utilization. Modern server power control features like Dynamic voltage and frequency scaling (DVFS) drive the server performance approximating energy-proportional computing by adapting processor operating frequency (voltage) upon run-time workload. The problem to be solved is designing an efficient solution for managing a virtualized data center with reduced energy consumption by utilizing both cluster-level server on-off energy management, and local DVFS control for server-level energy management.

On server level power control, there are independent or cooperative DVFS techniques. On cluster level energy management, there are dynamic server/load consolidation methods. While the solutions at each level may be combined to run a virtualized data center, they may interfere with each other, and a arbitrary combination of two solutions do not necessarily utilize their full capability. No energy management solution is proposed to explicitly manage the two levels in a coordinated approach.

SUMMARY

A method for coordinating energy management in a virtualized data center comprising a plurality of physical servers and a plurality of virtual machines, is disclosed herein. The method comprises analyzing in a computer process, status information about the virtualized data center; from the analyzed status information, determining in a computer process, server utilization target settings for server consolidation; and executing the server consolidation in a computer process, according to the determined server utilization target settings.

Also disclosed herein is a system for coordinating energy management in a virtualized data center comprising a plurality of physical servers and a plurality of virtual machines. The system comprises a processor executing instructions for analyzing status information about the virtualized data center; determining server utilization target settings for server consolidation, from the analyzed status information; and executing the server consolidation according to the determined server utilization target settings.

DETAILED DESCRIPTION

The present disclosure presents a Coordinated Energy Management (COEM) system. The COEM system enables lower energy costs in running a virtualized data center, and allows the enforcement of a probabilistic service level agreement (SLA) defining server overloading probability.

Figure 1A:
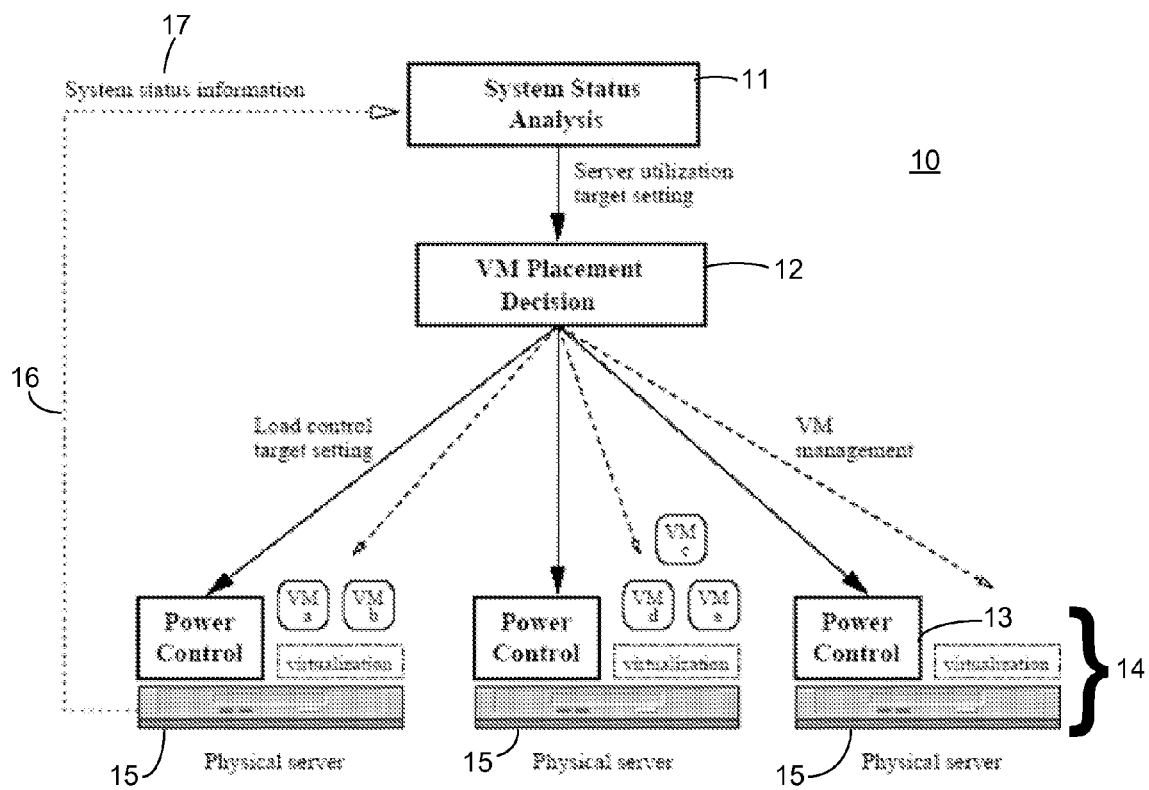
FIG. 1A is a functional block diagram illustrating an embodiment of a Coordinated Energy Management System in a virtualized data center.

FIG. 1A is a functional block diagram illustrating an embodiment of the COEM system 10 in a virtualized data center 14. The virtualized data center 14 can include two or more physical servers 15. The COEM system 10 includes a system status analysis component 11, a virtual machine (VM) placement decision component 12, and local power control in a server components 13 at the physical servers 15.

The COEM system 10 coordinates two-level energy management through two processes. In the first process, the system status analysis component 11 decides the server utilization target settings for the server consolidation process, which is executed by the VM placement decision component 12. After that, the VM placement decision component 12 decides the energy-related management target, such as server on-off or consolidation control or DVFS control target setting, for local power control components at the individual physical servers 15.

In the second process, a new VM sizing technology referred to herein as effective sizing, is applied in the VM placement decision, which improves the performance of both server consolidation and server DVFS control.

Figure 1B:
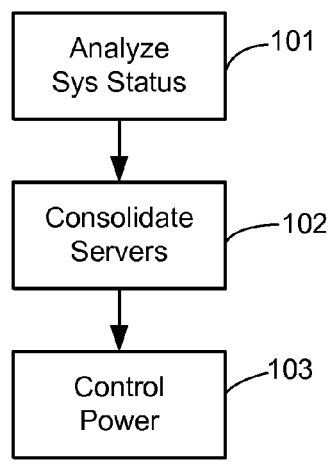
FIG. 1B is a process flow chart of the system of FIG. 1A.

FIG. 1B is a process flow chart of the COEM system 10 of FIG. 1A. In block 101, the system status analysis component 11 analyzes virtualized data center information such as server workload and performance violations, and decides server utilization target settings for a server consolidation process.

In block 102, the VM placement decision component 12 performs the server consolidation process. The VM placement decision component 12 uses VM workload, server inventory, and existing VM hosting information, and generates a new VM placement decision by considering migration cost and server utilization targets. The VM placement decision component 12 then notifies: 1) available VM management tools for VM-related execution, such as VM migration (represented by VMa-VMe in FIG. 1A) or rebooting; and 2) local power control components 13 at the individual physical servers 15 for energy-related management tasks, such as server on-off control or DVFS control target setting.

In block 103, the local power control components 13 at the servers 15, take orders on local power management and execute these orders to meet requirements. Specifically, the local power control components 13 at the servers 15 manage the power consumption of many components of the servers 15 including without limitation the CPUs, memories, disks, and network cards. Each local power control component 13 dynamically adjusts a local resource device (e.g., the CPU's power setting through the DVFS interface) so that the resource utilization (e.g., CPU utilization) can be maintained around a fixed point (e.g., 90%) if energy can be saved with a lower device power setting. Many approaches, such as feedback-loop control based, can be used for implementing one or more of the local power control components 13, and the COEM system 10 has no specification for that implementation. In the COEM system 10, the local power control components 13 are coordinated with a VM consolidation algorithm performed by the VM placement decision component 12 in two ways: at run-time, they are coordinated through the server utilization target setting; and 2) in performance optimization, they both benefit from load variance reduction through the introduction of effective VM sizing, as described further on.

Referring again to FIG. 1A, the COEM system 10 manages the virtualized data center 14 in a closed loop. Specifically, the actions from the VM placement decision and local power control components 12 and 13, impact the virtualized data center 14 operational status, i.e., the energy consumption and server overloading in percentage of time observed on the virtualized data center 14 at different time points. System status information 17 feeds back to the system status analysis component 11 via feedback loop 16. The system status analysis component 11 responds to the system status information 17 by adopting the correct server utilization settings.

Figure 2:
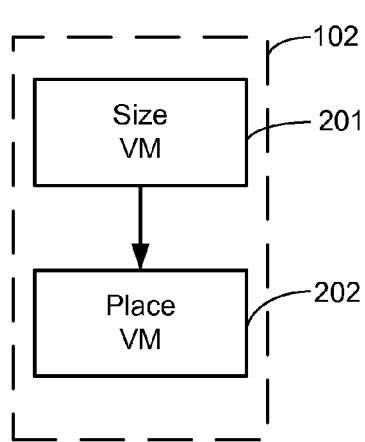
FIG. 2 is flow chart of a virtual machine placement decision process.

FIG. 2 is flow chart of an embodiment of the VM placement decision block 102 of FIG. 1B as performed by the VM placement decision component 12 of FIG. 1A. In block 201, the VM placement decision component 12 performs VM sizing. The VM sizing process determines the quantity of each physical server resource, such as the amount of CPU cycles (e.g., 1 GHz for a 3 GHz CPU) and/or memory, that will be allocated to a VM when placing it on a physical server 15. As will be explained in greater detail further on, effective sizing decides a VM's resource demand through statistical multiplexing principles, which consider multiple factors impacting the aggregated resource demand of a host (physical server) where that VM may be placed. It estimates the VM's contribution to the aggregate resource demand of a physical server through intrinsic demand, which is a function of the VM's own demand (as a distribution) and the server's capacity; and the correlation-aware demand, which is a function of the VM's demand and its time-line correlation relationship with the resource demand of the other VMs in the server.

In block 202, the VM placement decision component 12 executes a VM placement algorithm, which determines the order and the rules used for placing the VMs in the physical servers 15 and is based on the effective sizing of the VMs.

Figure 3:
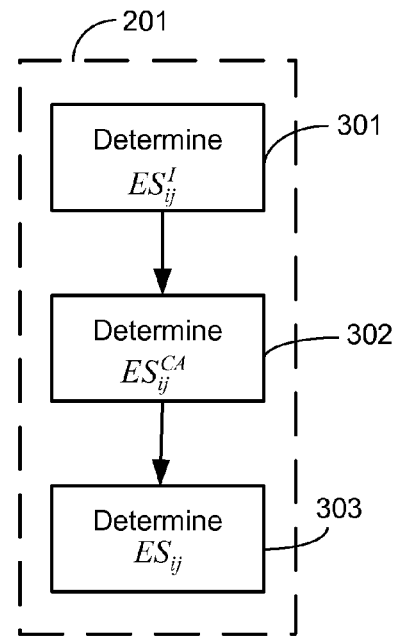
FIG. 3 is a flow chart of a virtual machine sizing process.

FIG. 3 is a flow chart of an embodiment of the VM sizing process of block 201 of FIG. 2. The VM sizing process utilizes effective sizing ES, which is defined as a random variable $X_i$ representing a VM i's resource demand, and another random variable $X_j$ representing a server j's existing aggregate resource demand from VMs already allocated to it. The effective size ES of VM i, if hosted on server j, has two effective size components: intrinsic demand $ES_{ij}^I$ and correlation-aware demand $ES_{ij}^{CA}$. In block 301, the intrinsic demand $ES_{ij}^I$ can be represented by the following equation $$ES_{ij}^I \frac{C_j}{N_{ij}} \quad (1)$$

and $N_{ij}$ is derived by solving the following equation $$P_r\left[\sum_{k=0}^{N_{ij}-1} U_k > C_j\right] \leq p \quad (2)$$

where $U_k$ are independent and identically distributed (i.i.d.) random variables with the same distribution as $X_i$, and $C_j$ is the server utilization target of server j. Intuitively, $N_{ij}$ is the number of VMs that can be packed into server j without breaking a probabilistic Service Level Agreement (SLA) when all the VMs have the same workload pattern as VM i. The probabilistic SLA is defined in equation (2), which describes: for a server j in the virtualized data center 14, the probability that its aggregated resource demand (e.g., CPU utilization), caused by the VMs hosted on it, exceeds a server utilization threshold Cj (i.e., the server utilization target setting) at any time will be no higher than a numerical value p, where p is a server overloading probability defined in the probabilistic SLA.

Hence, the resource demand of VM i is calculated in block 301 using three factors: 1) its resource utilization historical information, which is modeled as a random variable $X_i$ with its distribution information including mean and variance; 2) the server capacity $C_j$; and 3) a Service Level Agreement (SLA) defining server overloading probability p. The SLA is defined in equation 2 as follows: for a server j in the virtualized data center, the probability that its resource utilization (e.g., CPU utilization), caused by the VMs hosted on it, is greater than a threshold $C_j$ at any time will be no higher than a numerical value p.

Equation (2) is solved to find $N_{ij}$, the number of VMs that can be packed into server j without breaking the probabilistic SLA when all the VMs have the same workload distribution as VM i but are probabilistically independent from each other. Equation (1) is solved based on $N_{ij}$ and on the server capacity $C_j$, and provides the value for intrinsic demand $ES_{ij}^I$.

In block 302, the correlation-aware demand $ES_{ij}^{CA}$ can be represented by the following equation $$ES_{ij}^{CA} = Z_\alpha(\sqrt{\sigma_i^2+\sigma_j^2+2\rho_{xy}\sigma_i\sigma_j}-\sqrt{\sigma_i^2+\sigma_j^2}) \quad (3)$$

where $\sigma_i^2$ and $\sigma_j^2$ are the variances of the random variables $X_i$ and $X_j$; $\rho_{xy}$ is the correlation between $X_i$ and $X_j$; and $Z_\alpha$ denotes the α-percentile for the unit normal distribution (α=1−ρ). For example, if we want the server overflowing probability ρ=0.25%, then α=99.75% and $Z_\alpha=3$.

Therefore, in block 302, the extra resource demand of VM i is calculated, which calculation considers workload correlation between VM i and the other VMs hosted on server j. The extra resource demand is based on three factors: 1) VM i's resource utilization historical information, which is modeled as a random variable $X_i$ with its distribution information including mean and variance; 2) the resource utilization historical information of server j derived from the aggregated workload of all the VMs currently allocated to server j, which is modeled as a random variable Xj with its distribution information including the load variance; and 3) the SLA defining server overloading probability p, also defined for block 301.

Equation (3) is solved by finding the difference between $Z_\alpha \sqrt{\sigma_i^2 + \sigma_j^2 + 2\rho_{xy}\sigma_i\sigma_j}$, the expected load variation of the aggregated workload on server j considering the correlation between $X_i$ and $X_j$, and $Z_\alpha\sqrt{\sigma_i^2+\sigma_j^2}$, the expected load variation of the aggregated workload on server j assuming no correlation between $X_i$ and $X_j$. The result of equation (3) is referred to herein as the correlation-aware demand $ES_{ij}^I$.

In block 303, the effective size $ES_{ij}$ of VM i if hosted on server j is determined by combining the intrinsic demand and the correlation-aware demand:

$$ES_{ij} = ES_{ij}^I + ES_{ij}^{CA}.$$

Figure 4A:
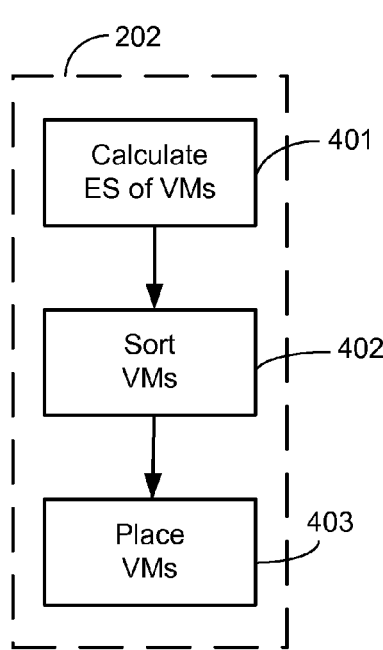
FIGS. 4A-4B are flow charts of three embodiments of a virtual machine placement algorithm.
Figure 4B:
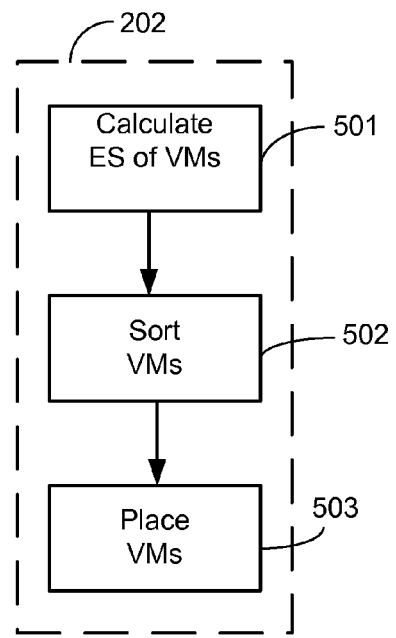

FIGS. 4A-4B are flow charts of three embodiments of the VM placement algorithm 202, which are each based on the effective sizing process of FIG. 3. The three embodiments of the VM placement algorithm 202 each provide a different balance of algorithm simplicity, consolidation efficiency and VM migration cost and are intended for different consolidation scenarios. FIG. 4A is a flow chart of an independent workload (IW) VM placement algorithm that assumes a cluster of homogeneous servers and uses a data structure including a VM list with load distributions and a physical server list including a server utilization target and a server overflowing probability p defined in the probabilistic SLA. In block 401, the effective size ES of each VM i in the VM list is calculated using equations (1) and (2) described above. In block 402, the VMs are sorted in decreasing order according to their effective size calculated in block 401. In block 403, each VM i is placed, according to the order determined in block 402, on the first physical server 15 of the physical server list that has sufficient remaining capacity, i.e., where the sum of allocated VM effective size is no more than the server utilization target or in other words, where the addition of the current to-be-placed VM's effective size into the sum of the effective sizes of all the VMs preceding it, and the placement of the VM i on the current server j, causes the total value to be no more than the server utilization target. The process of block 403 is repeated until all VMs have been placed on the physical servers 15 in the physical server list or as an option, when the virtualized data center is out of server capacity in the middle of the placement process, applying a load balancing scheme (e.g., max-min load balancing) to finish the placement of the remaining VMs, where effective sizing still applies in determining a VM's resource demand.

In practice, equation (2) may be difficult to solve in block 401 without a simple load model, where the term "load" refers to a VM's resource utilization (e.g., CPU utilization). In one embodiment, equation (2) can be solved by using a normal distribution model for approximation and by calculating two numbers $(\mu_i, \sigma_i)$ for each VM i based on its load (i.e., resource utilization history information), where $\mu_i$ is the average load, and $\sigma_i$ is the load standard deviation. The closed-form solution for equation (2) under s normal distribution is $$N_{ij} = \frac{2Z_\alpha^2\sigma_i^2 + 4\mu_i C_j - 2Z_\alpha\sigma_i\sqrt{Z_\alpha^2\sigma_i^2 + 4\mu_i}}{4\mu_i^2}$$

If the cluster of servers are heterogeneous thereby preventing a VM's effective size from be calculated before block 403, then blocks 401 and 402 can be modified to base the placement order on the value of $\mu_i + Z_\alpha\sigma_i$, and the actual effective size can be used in the target server in block 403. To incorporate the server power efficiency factor into this process, the servers 15 in the server list can be sorted in decreasing order by the power efficiency metrics in block 403. Other resource constraints, such as server memory, can be considered in this process by adding them in the block 403 process when judging a server's availability.

FIG. 4B is a flow chart of a correlation aware (CA) VM placement algorithm that assumes a cluster of homogeneous servers and uses a data structure including a VM list with load distributions and a physical server list including a server utilization target and an overflowing probability. In block 501, the intrinsic load $ES_{ij}^I$ of each VM is calculated using equations (1) and (2). In block 502, the VMs are sorted in decreasing order according to their intrinsic load $ES_{ij}^I$. In block 503, each VM i is placed, according to the order determined in block 502, on the best non-empty physical server 15 in the physical server list (i.e., yields a minimal correlation-aware demand for VM i using equation (3)), which is determined to have sufficient remaining capacity and that yields a minimal correlation-aware demand $ES_{ij}^{CA}$ for VM i using equation (3). If no such server is available, the next empty server 15 is selected from the physical server list, which is determined to have sufficient remaining capacity and that yields a minimal correlation-aware demand $ES_{ij}^{CA}$ for i using equation (3), and so on until the VM i is placed on one of the servers 15. The process of block 503 is repeated until all VMs have been placed on the physical servers 15 listed in the physical server list, or as an option, when the virtualized data center is out of server capacity in the middle of the placement process, applying a load balancing scheme (e.g., max-min load balancing) to finish the placement of the remaining VMS, where effective sizing still applies in determining a VM's resource demand.

If the cluster of servers are heterogeneous thereby preventing a VM's effective size from be calculated before block 503, then blocks 501 and 502 can be modified to base the placement order on the value of $\mu_i + Z_\alpha\sigma_i$, which is independent of the servers; and the actual effective size in the target server will be calculated for the intrinsic load using equations (1) and (2), and correlation-aware demand using equation (3) in block 503. To incorporate the server power efficiency factor into this process, the servers 15 in the server list can be sorted in decreasing order by the power efficiency metrics in block 503. Other resource constraints, such as server memory, can be considered in this process by adding them in the block 503 process when judging a server's availability.

Figure 4C:
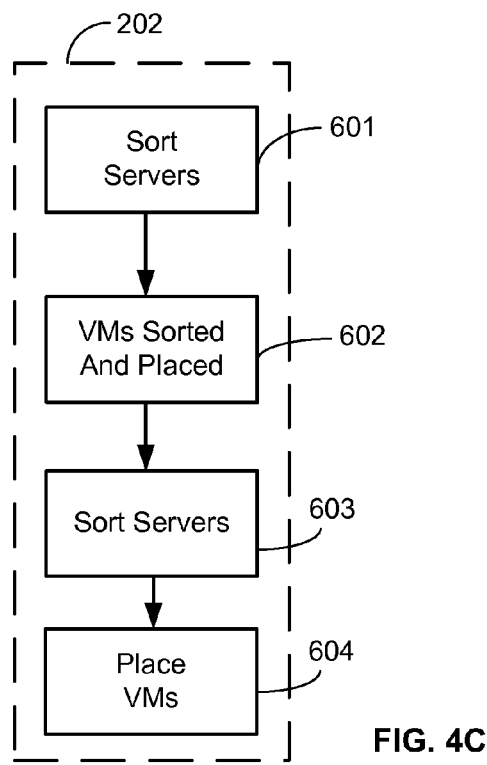

FIG. 4C is a flow chart of a migration cost and correlation aware (CA) VM placement algorithm, which uses a data structure including a VM list with load distributions; a physical server list including server load information, a server utilization target, and an overflowing probability; and existing VM hosting information (VM i, server j). In block 601, the physical servers in the physical server list are sorted in decreasing order by server load. In block 602, for each overloaded server j with violated SLAs (server overflowing probability>ρ), (a) the VMs hosted on the overloaded server j are sorted in decreasing order by their correlation-aware demand $ES_{ij}^{CA}$ using equation (3); (b) each VM i is placed, according to the order determined in (a), in the best non-empty and underloaded server k in the physical server list, which has sufficient remaining capacity and yields the minimal correlation-aware demand $ES_{ik}^{CA}$, i.e., where the sum of allocated VM effective size is no more than the server utilization target or in other words, where the addition of the current to-be-placed VM's effective size into the sum of the effective sizes of all the VMs preceding it, and the placement of the VM i on the current server j, causes the total value to be no more than the server utilization target. If no such server is available, the next empty server is selected from the server list and so on until the VM i is placed on a server; and (c) if server, j's load meets the overflowing constraint after moving out VM i, the searching process is terminated for this server and the process moves to the next overloaded server; otherwise, the searching process is continued for the remaining VMs (i.e., the VM set hosted on server j in (a)). In (c), the VMs are migrated out of overloaded server j so that server j's aggregated workload will drop low enough to meet the SLA defined on the server overloading probability p.

In block 603, the remaining underloaded servers are sorted in increasing order by server load. In block 604, for each underloaded server j in the order determined in block 603, each VM i on the server is placed on or migrated to the best non-empty and underloaded server k in the physical server list, which has sufficient remaining capacity and yields a minimal correlation-aware demand $ES_{ik}^{CA}$ using equation (3). If no such server is available, the searching process is terminated for this server and the process moves on to the next underloaded server. When all the VMs in this server can find a target underloaded server to migrate to, this server is labeled as an empty server and all the VMs are migrated out of this server. The empty server is then shutdown to save energy. Note that VMs could end up with different servers, as block 604 is executed sequentially on VMs one after another.

To have the server power efficiency factor considered in this process, the servers can be subsequently sorted in decreasing order by the power efficiency metrics in the processes of blocks 602 and 603, i.e., more power efficient servers are higher in the order; and servers with the same power efficiency will be sorted in increasing order by the load. Other resource constraints, such as memory, can be considered in this process by adding them in processes of blocks (602 and 603 when judging a server's availability.

Figure 5:
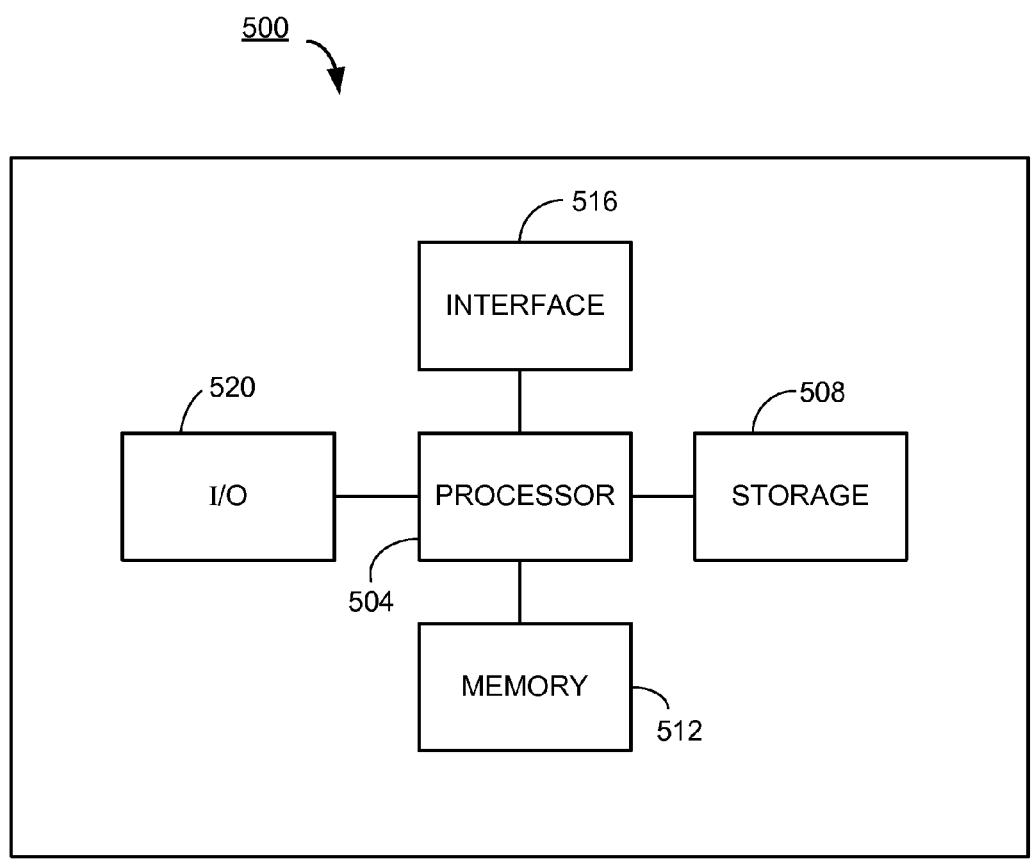
FIG. 5 is a block diagram of a computer apparatus for implementing the methods and systems disclosed herein.

The methods of the present disclosure may be performed by an appropriately programmed computer apparatus, the configuration of which is well known in the art. An appropriate computer apparatus may be implemented, for example, using well known computer processors, memory units, storage devices, computer software, and other modules. A block diagram of a non-limiting embodiment of the computer apparatus is shown in FIG. 5 and denoted by reference numeral 500. The computer apparatus 500 includes, without limitation, a processor 504 which controls the overall operation of computer apparatus 500 by executing computer program instructions corresponding to the methods of the present disclosure. The computer program instructions can be stored in a storage device 508 (e.g., magnetic disk) and loaded into memory 512 when execution of the computer program instructions is desired. The computer apparatus 500 further includes one or more interfaces 516 for communicating with other devices (e.g., locally or via a network). The computer apparatus 500 still further includes input/output 520 which represents devices which allow for user interaction with the computer apparatus 500 (e.g., display, keyboard, mouse, speakers, buttons, etc.).

One skilled in the art will recognize that an actual implementation of a computer apparatus executing computer program instructions corresponding to the methods of the present disclosure, can also include other elements as well, and that FIG. 5 is a high level representation of some of the elements of the computer apparatus for illustrative purposes. Further, a computer apparatus executing computer program instructions corresponding to the methods of the present disclosure, can be component of a larger apparatus or system. In addition, one skilled in the art will recognize that the methods described herein may also be implemented using dedicated hardware, the circuitry of which is configured specifically for implementing the method. Alternatively, the methods may be implemented using various combinations of hardware and software.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for coordinating energy management in a virtualized data center comprising a plurality of physical servers and a plurality of virtual machines, the method comprising the steps of:

analyzing in a computer process, status information about the virtualized data center;

from the analyzed status information, determining in a computer process, server utilization target settings for server consolidation; and executing the server consolidation in a computer process, according to the determined server utilization target settings by determining an effective size of each of the virtual machines, the effective size of each of the virtual machines for determining a quantity of server resources that virtual machine will be allocated when placed on one of the physical servers; and placing the virtual machines on the servers in a selective manner, wherein the step of placing the virtual machines on the servers in a selective manner includes:
(a) sorting the virtual machines in decreasing order according to their intrinsic load;
(b) placing the virtual machines, according to the order obtained in step (a), on non-empty ones of the physical servers that yield minimal correlation-aware demands for respective ones of the virtual machines and have sufficient remaining capacity;
(c) if the non-empty ones of the servers are not available for one or more of the virtual machines, placing the one or more virtual machines on empty ones of the physical servers that yield minimal correlation-aware demands for respective ones of the virtual machines and have sufficient remaining capacity;
(d) repeating steps (b) and (c) until all the virtual machines have been placed on the physical servers.

2. The method of claim 1, wherein the step of determining the effective size of the virtual machine includes the steps of:
calculating an intrinsic resource demand of the virtual machine;
calculating a correlation-aware resource demand which considers workload between the virtual machine and other virtual machines hosted on the selected server; and
combining the intrinsic and correlation-aware resource demands.

3. The method of claim 1, wherein the step of placing the virtual machines on the servers in a selective manner includes the steps of:
(a) sorting the virtual machines in decreasing order according to their calculated intrinsic load;
(b) placing the virtual machines, according to the order obtained in step (a), on first ones of the physical servers that have sufficient remaining capacity; and
(c) repeating step (b) until all the virtual machines have been placed on the physical servers.

4. The method of claim 3, wherein if during the repeating of step (b) the physical servers that have sufficient remaining capacity become exhausted prior to the placement of all the virtual machines, further including the step of:
(d) applying load balancing to remaining ones of the virtual machines until all the remaining ones of the virtual machines have been placed on the physical servers.

5. The method of claim 3, wherein prior to steps (b) and (c) further comprising the step of:
(e) sorting the physical servers in decreasing order according to their respective power efficiency metrics.

6. The method of claim 1, wherein if during the repeating of steps (b) and (c) the physical servers that have sufficient remaining capacity become exhausted prior to the placement of all the virtual machines, further including the step of:
(e) applying load balancing to remaining ones of the virtual machines until all the remaining ones of the virtual machines have been placed on the physical servers.

7. The method of claim 1, wherein prior to steps (b), (c), and (d) further comprising the step of:
(f) sorting the physical servers in decreasing order according to their respective power efficiency metrics.

8. The method of claim 1, wherein the step of placing the virtual machines on the servers in a selective manner includes the step of:
sorting the physical servers in decreasing order according to server load wherein the order decreases from overloaded servers to underloaded servers.

9. The method of claim 8, further comprising the steps of:
(a) selecting one of the overloaded physical servers according to the order achieved in the sorting step;
(b) sorting the virtual machines hosted on the selected overloaded physical server in decreasing order by their correlation-aware demand calculated when being placed on the overloaded server;
(c) removing the virtual machines hosted on the overloaded physical servers and placing them according to the order obtained in step (b), on non-empty and underloaded ones of the physical servers that yield minimal correlation-aware demands for respective ones of the virtual machines and have sufficient remaining capacity;
(d) if the non-empty and underloaded ones of the servers are not available for placing one or more of the virtual machines, placing the one or more of the removed virtual machines on empty ones of the physical servers that yield minimal correlation-aware demands for respective ones of the virtual machines and have sufficient remaining capacity; and
(e) terminating the removal of the virtual machines from the selected overloaded physical server once it is no longer overloaded;
(f) selecting another one of the overloaded physical servers and repeating steps (b) through (e) until all the virtual machines have been placed on the physical servers.

10. The method of claim 9, further comprising the steps of:
(g) sorting remaining ones of the underloaded servers in increasing order by server load;
(h) for each underloaded server in the order determined in step (g), removing each of the virtual machines hosted on the server placing them on a non-empty and underloaded one of the physical servers that has sufficient remaining capacity and yields a minimal correlation-aware demand;
(i) labeling each of the underloaded physical servers as empty if all the virtual machines are removed from this server.

11. The method of claim 9, wherein prior to step (a), further comprising the step of:
sorting the overloaded one of the physical servers in decreasing order according to their respective power efficiency metrics.

12. The method of claim 10, wherein prior to step (g), further comprising the step of:
sorting the underloaded ones of the physical servers in decreasing order according to their respective power efficiency metrics.

13. The method of claim 1, further comprising the step of adjusting the server's energy status according to an aggregate effective size of the virtual machines placed on that server.

14. A system for coordinating energy management in a virtualized data center comprising a plurality of physical servers and a plurality of virtual machines, the system comprising:
a processor executing instructions for:
analyzing status information about the virtualized data center;
determining server utilization target settings for server consolidation, from the analyzed status information; and
executing the server consolidation according to the determined server utilization target settings
sorting the physical servers in decreasing order according to server load wherein the order decreases from overloaded servers to underloaded servers, including:
(a) selecting one of the overloaded physical servers according to the order achieved in the sorting step;
(b) sorting the virtual machines hosted on the selected overloaded physical server in decreasing order by their correlation-aware demand;
(c) removing the virtual machines hosted on the overloaded physical servers and placing them according to the order obtained in (b), on non-empty and underloaded ones of the physical servers that yield minimal correlation-aware demands for respective ones of the virtual machines and have sufficient remaining capacity;
(d) if the non-empty and underloaded ones of the servers are not available for placing one or more of the virtual machines, placing the one or more of the removed virtual machines on empty ones of the physical servers that yield minimal correlation-aware demands for respective ones of the virtual machines and have sufficient remaining capacity; and
(e) terminating the removal of the virtual machines from the selected overloaded physical server once it is no longer overloaded;
(f) selecting another one of the overloaded physical servers and repeating (b) through (e) until all the virtual machines have been placed on the physical servers.

15. The system of claim 14, wherein the instructions for executing server consolidation includes instructions for:
determining an effective size of each of the virtual machines, the effective size of each of the virtual machines for determining a quantity of server resources that virtual machine will be allocated when placed on one of the physical servers; and
placing the virtual machines on the servers in a selective manner.

16. The system of claim 15, wherein the instructions for determining the effective size of the virtual machine includes instructions for:
calculating an intrinsic resource demand of the virtual machine;

calculating a correlation-aware resource demand which considers workload between the virtual machine and other virtual machines hosted on the selected server; and combining the intrinsic and correlation-aware resource demands.

17. The system of claim 15, wherein the instructions for placing the virtual machines on the servers in a selective manner includes instructions for:
   (a) sorting the virtual machines in decreasing order according to their calculated intrinsic load;
   (b) placing the virtual machines, according to the order obtained in (a), on first ones of the physical servers that have sufficient remaining capacity; and
   (c) repeating (b) until all the virtual machines have been placed on the physical servers.

18. The system of claim 17, wherein if during the repeating of (b) the physical servers that have sufficient remaining capacity become exhausted prior to the placement of all the virtual machines, further including instructions for:
   (d) applying load balancing to remaining ones of the virtual machines until all the remaining ones of the virtual machines have been placed on the physical servers.

19. The system of claim 17, wherein prior to (b) and (c) further comprising instructions for:
   (e) sorting the physical servers in decreasing order according to their respective power efficiency metrics.

20. The system of claim 15, wherein the instructions for placing the virtual machines on the servers in a selective manner includes instructions for:
   (a) sorting the virtual machines in decreasing order according to their intrinsic load;
   (b) placing the virtual machines, according to the order obtained in (a), on non-empty ones of the physical servers that yield minimal correlation-aware demands for respective ones of the virtual machines and have sufficient remaining capacity;
   (c) if the non-empty ones of the servers are not available for one or more of the virtual machines, placing the one or more virtual machines on empty ones of the physical servers that yield minimal correlation-aware demands for respective ones of the virtual machines and have sufficient remaining capacity;
   (d) repeating (b) and (c) until all the virtual machines have been placed on the physical servers.

21. The system of claim 20, wherein if during the repeating of (b) and (c) the physical servers that have sufficient remaining capacity become exhausted prior to the placement of all the virtual machines, further including instructions for:
   (e) applying load balancing to remaining ones of the virtual machines until all the remaining ones of the virtual machines have been placed on the physical servers.

22. The system of claim 20, wherein prior to (b), (c), and (d) further comprising instructions for:
   (f) sorting the physical servers in decreasing order according to their respective power efficiency metrics.

23. The method of claim 1, further comprising instructions for:
   (g) sorting remaining ones of the underloaded servers in increasing order by server load;
   (h) for each underloaded server in the order determined in (g), removing each of the virtual machines hosted on the server placing them on a non-empty and underloaded one of the physical servers that has sufficient remaining capacity and yields a minimal correlation-aware demand;
   (i) labeling each of the underloaded physical servers as empty if all the virtual machines are removed from this server.

24. The method of claim 1, wherein prior to (a), further comprising instructions for:
   sorting the overloaded one of the physical servers in decreasing order according to their respective power efficiency metrics.

25. The method of claim 23, wherein prior to (g), further comprising instructions for:
   sorting the underloaded ones of the physical servers in decreasing order according to their respective power efficiency metrics.

26. The system of claim 15, further comprising instructions for adjusting the server's energy status according to an aggregate effective size of the virtual machines placed on that server.

\* \* \* \* \*